US011085798B2

(12) United States Patent
Kirkhope et al.

(10) Patent No.: US 11,085,798 B2
(45) Date of Patent: Aug. 10, 2021

(54) SYSTEM AND METHOD FOR MONITORING FAULT CONDITIONS IN A PAN LINE OF A LONGWALL MINING SYSTEM

(71) Applicant: Caterpillar Global Mining Europe GmbH, Lünen (DE)

(72) Inventors: Euan Russell Kirkhope, Waratah (AU); Nigel Peter Boswell, Ferny Grove (AU)

(73) Assignee: Caterpillar Global Mining Europe GmbH, Lunen (DE)

( * ) Notice: Subject to any disclaimer, the term of this patent is extended or adjusted under 35 U.S.C. 154(b) by 202 days.

(21) Appl. No.: 16/521,175

(22) Filed: Jul. 24, 2019

(65) Prior Publication Data
US 2020/0049533 A1 Feb. 13, 2020

(30) Foreign Application Priority Data
Aug. 7, 2018 (GB) ..................... 1812798

(51) Int. Cl.
| *G01D 5/26* | (2006.01) |
| *G02B 6/02* | (2006.01) |
| *E21F 13/06* | (2006.01) |
| *E21C 25/28* | (2006.01) |
| *E21C 35/20* | (2006.01) |

(52) U.S. Cl.
CPC ............. *G01D 5/268* (2013.01); *E21F 13/06* (2013.01); *G02B 6/022* (2013.01); *E21C 25/28* (2013.01); *E21C 35/20* (2013.01)

(58) Field of Classification Search
None
See application file for complete search history.

(56) References Cited

U.S. PATENT DOCUMENTS

| 4,733,771 A | 3/1988 | Gruendken et al. |
| 6,332,365 B1 | 12/2001 | Hodac |
| 6,571,042 B1 | 5/2003 | Kordahi |
| 7,772,541 B2 | 8/2010 | Froggatt et al. |
| (Continued) | | |

FOREIGN PATENT DOCUMENTS

CN 206441305 U 8/2017

OTHER PUBLICATIONS

Search Report for related United Kingdom Application No. 1812798.5; reported on Jan. 22, 2019.

*Primary Examiner* — Chad H Smith
(74) *Attorney, Agent, or Firm* — von Briesen & Roper, s.c.

(57) ABSTRACT

A system for monitoring a condition of a pan line associated with a longwall mining system includes multiple pan segments arranged in a successive manner. Adjacently located pan segments are moveably coupled by an interconnecting joint. An underside of each pan segment defines an opening whose axis is parallel to a plane of the associated pan segment. The system also includes a fiber optic shape sensing system that has a fiber optic cable disposed along the multiple pan segments and located within the opening of each pan segment. A controller coupled to the fiber optic cable detects a shape of the fiber optic cable, identifies a position of each pan segment based on the detected shape of the fiber optic cable, and determines if a fault exists in the interconnecting joints between adjacently located pan segments based on the identified positions of respective ones of the adjacently located pan segments.

20 Claims, 5 Drawing Sheets

(56) References Cited

U.S. PATENT DOCUMENTS

| | | |
|---|---|---|
| 8,050,523 B2 | 11/2011 | Younge et al. |
| 8,128,176 B2 | 3/2012 | Klabisch et al. |
| 8,542,114 B2 | 9/2013 | Stolarczyk |
| 8,622,481 B2 | 1/2014 | Niederriter et al. |
| 9,803,477 B2 | 10/2017 | Friend |
| 2016/0097277 A1 | 4/2016 | Friend |
| 2016/0116633 A1* | 4/2016 | Friend .................... G01H 9/004 356/614 |
| 2017/0010185 A1 | 1/2017 | Shaffer |

* cited by examiner

SYSTEM AND METHOD FOR MONITORING FAULT CONDITIONS IN A PAN LINE OF A LONGWALL MINING SYSTEM

TECHNICAL FIELD

The present disclosure relates to a longwall mining system. More particularly, the present disclosure relates to a system and method for monitoring a condition of a pan line associated with a longwall mining system.

BACKGROUND

A longwall mining system typically includes a pan line and a longwall shearer that is configured to travel over the pan line. As the pan line is configured to support movement of the longwall shearer thereon, it may be desirable to monitor a condition of the pan line. Particularly, when the pan line includes multiple pan segments, adjacent ones of the pan segments are likely to be coupled with the help of an interconnecting joint. As these interconnecting joints may be subject to severe loads and extreme operating conditions, a failure of the interconnecting joints could negatively impact machine performance and/or compromise operator safety. Therefore, it may be advantageous to monitor and determine whether the condition of respective ones of the interconnecting joints is in order for supporting the movement of the longwall shearer along the pan line.

Hence, there exists a need for a system for monitoring a condition of the pan line that is associated with the longwall mining system.

SUMMARY OF THE DISCLOSURE

In an aspect of the present disclosure, a system for monitoring a condition of a pan line associated with a longwall mining system includes multiple pan segments that are arranged in a successive manner such that adjacently located pan segments are moveably coupled by an interconnecting joint. An underside of each pan segment would be configured to define an opening therein. The opening has an axis that is generally parallel to a plane of the associated pan segment. The system also includes a fiber optic shape sensing (FOSS) system. The FOSS system includes a fiber optic cable that is disposed along the multiple pan segments and located within the opening of each pan segment. The FOSS system also includes a controller that is communicably coupled to the fiber optic cable. The controller is configured to detect a shape of the fiber optic cable, identify a position of each pan segment based on the detected shape of the fiber optic cable, and determine if a fault exists in the interconnecting joint between the adjacently located pan segments based on the identified positions of respective ones of the adjacently located pan segments.

In another aspect of the present disclosure, a method for monitoring fault conditions in a pan line of a longwall mining system is provided. The method includes arranging multiple pan segments in a successive manner and coupling adjacently located pan segments with an interconnecting joint. The method also includes defining an opening on an underside of each pan segment such that the opening has an axis generally parallel to a plane of the associated pan segment. The method further includes providing a fiber optic cable along the multiple pan segments such that the fiber optic cable is located within the opening of each pan segment. Furthermore, the method includes coupling a controller, in communication, to the fiber optic cable, and detecting, by means of the controller, a shape of the fiber optic cable, identifying, by means of the controller, a position of each pan segment based on the detected shape of the fiber optic cable, and determining, by means of the controller, if a fault exists in the interconnecting joint between the adjacently located pan segments based on the identified positions of respective ones of the adjacently located pan segments.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts. With reference to the drawings, the claims, and the specification, the present disclosure is directed to a system and a method for monitoring a condition of a pan line associated with a longwall mining system.

Figure 1:
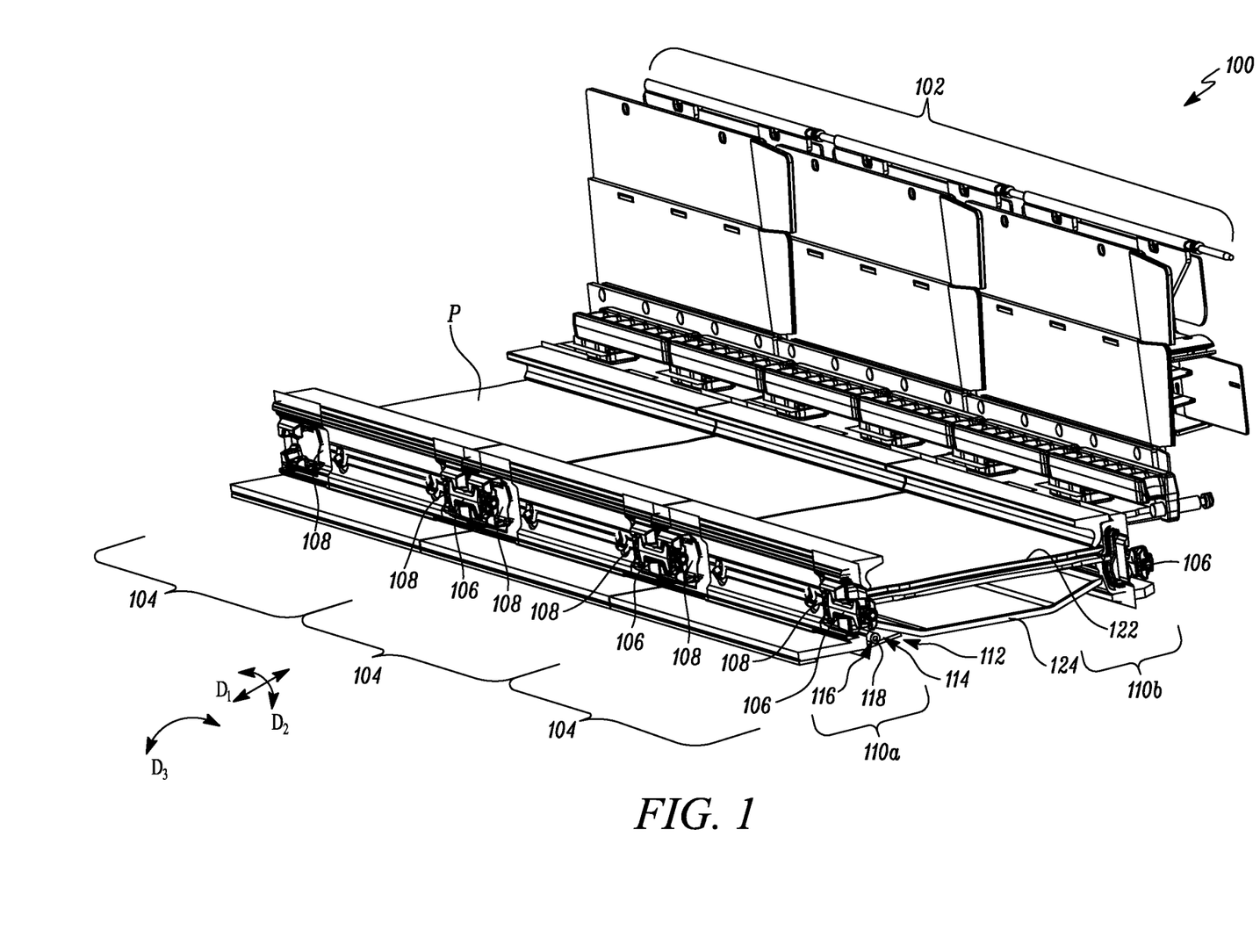
FIG. 1 is a side perspective view of a pan line of a longwall mining system, in accordance with an embodiment of the present disclosure.

Referring to FIG. 1, a longwall mining system 100 is depicted. As shown, the longwall mining system 100 includes a pan line 102 that would be configured to support movement of a longwall shearer (not shown) thereon. Moreover, as shown in the illustrated embodiment of FIG. 1, the pan line 102 is formed from multiple pan segments 104 that are arranged in a successive manner.

Further, end portions 108 of adjacent pan segments 104 are configured such that the adjacent pan segments 104 can be moveably coupled to each other using an interconnecting joint 106. As shown in the illustrated embodiment of FIGS. 1 and 2, these interconnecting joints 106 could be located at a fore portion 110a and a rear portion 110b of each pan segment 104. Further, as shown in the illustrated embodiment of FIGS. 1 and 2, each of the interconnecting joints 106 are embodied to exhibit the shape of a dog bone. However, in other embodiments, the interconnecting joints 106 may embody other shapes in lieu of the dog bone shape disclosed herein. Therefore, a shape of the interconnecting joint 106 is merely exemplary in nature and hence, non-limiting of this disclosure. Persons skilled in the art will appreciate that the system and the method of the present disclosure are similarly applicable with the use of interconnecting shapes other than that disclosed herein.

Referring to FIG. 1, each pan segment 104 is capable of being axially displaced, pitched, and rolled as indicated by bi-directional arrows $D_1$, $D_2$, and $D_3$ respectively. Moreover, as best shown in the illustrated embodiments of FIGS. 2 and 3, each pan segment 104 would include a top wall 122 and a bottom wall 124. The top wall 122 and the bottom wall 124 are located in a spaced apart relation to one another for allowing a conveyor (not shown), for example, a chain to pass therebetween.

Figure 2:
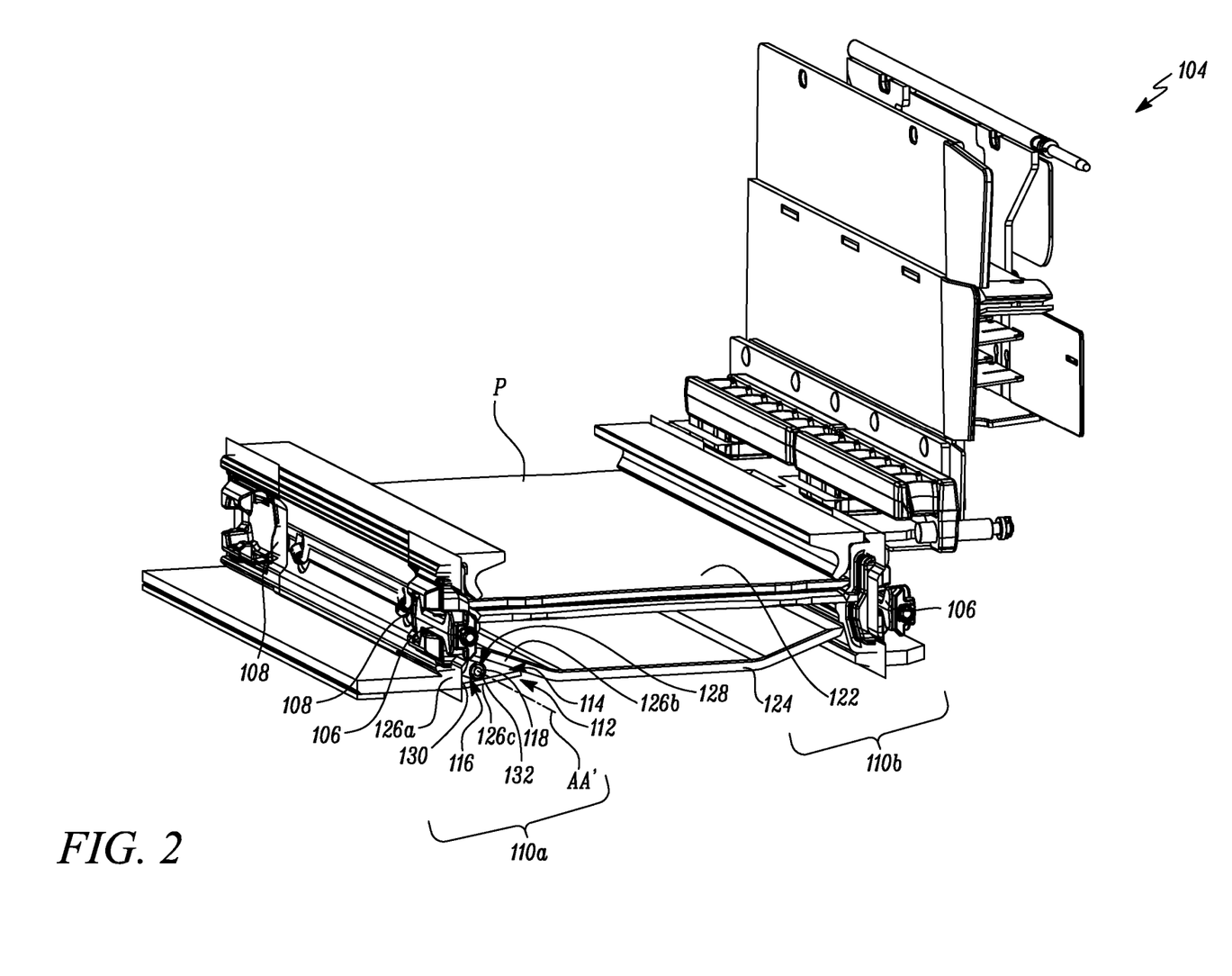
FIG. 2 is a front perspective view of a pan segment of the pan line showing a portion of a fiber optic shape sensing (FOSS) system being installed in an opening of the pan segment, according to an embodiment of the present disclosure.

Further, an underside 112 of each pan segment 104 would be configured to define an opening 114 therein. Particularly, in one embodiment as shown in FIG. 2, the opening 114 is bound on at least three sides by a first wall 126a, a second wall 126b, and a third wall 126c that are located on the underside 112 of the pan segment 104. In the illustrated embodiment of FIG. 2, the second wall 126b is shown as forming part of the bottom wall 124. However, in other embodiments, the second wall 126b could be embodied as another wall that is distinct from the bottom wall 124 of the pan segment 104. Furthermore, an axis AA' of the opening 114 would be generally parallel to a plane P of the associated pan segment 104.

In embodiments herein, although the first, second, and third walls 126a, 126b, and 126c are disclosed, such a configuration of walls i.e., the first, second, and third walls 126a, 126b, and 126c is non-limiting of this disclosure. It may be noted that in other embodiments of this disclosure, the underside 112 of each pan segment 104 could be alternatively configured into having fewer or more walls in lieu of the first, second, and third walls 126a, 126b, 126c for defining the opening 114. For example, the opening 114 could be defined axially within an elongated tubular structure (not shown) that would be integrally formed with the bottom wall 124.

Figure 3:
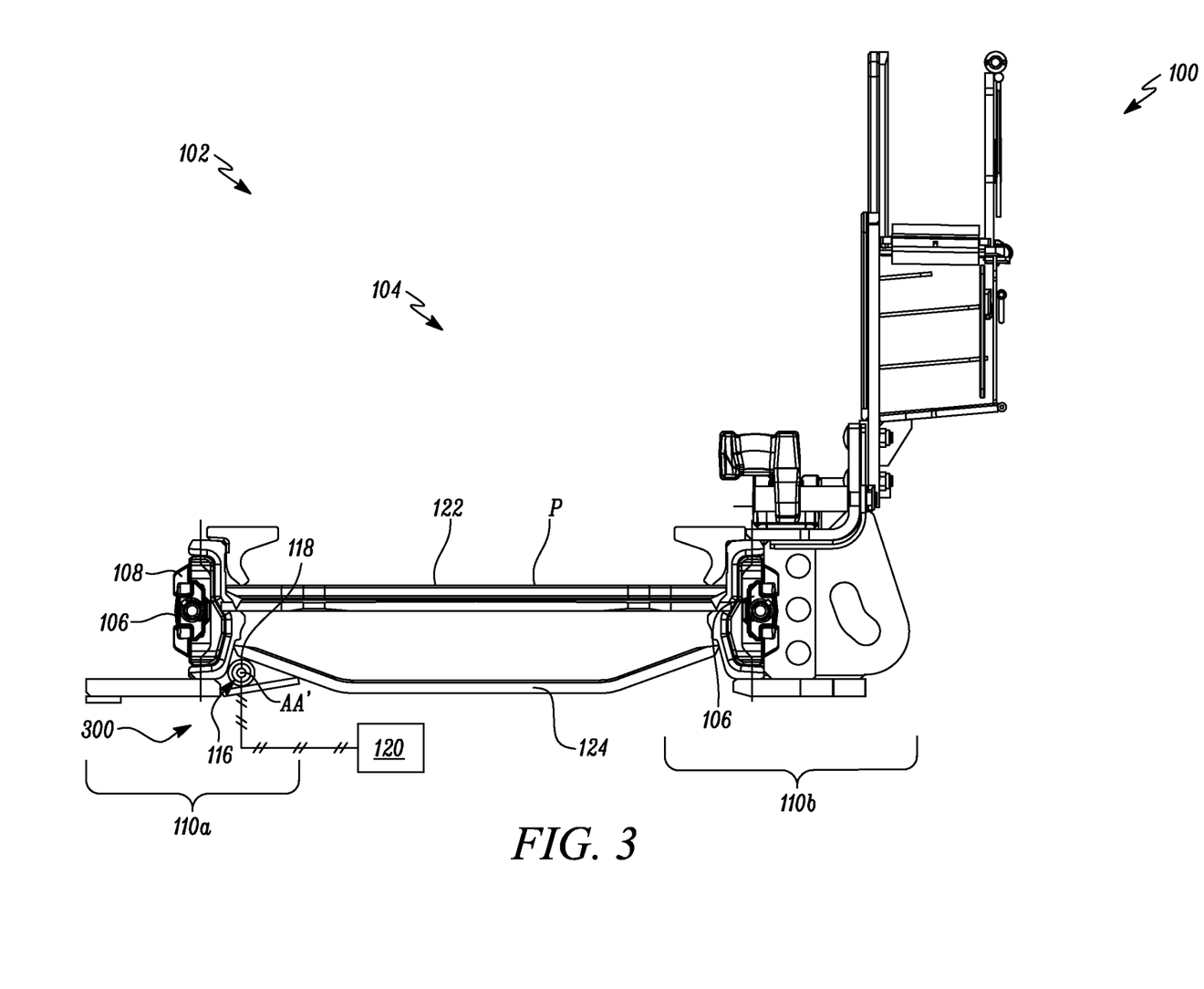
FIG. 3 is a front view of the pan segment of the pan line showing a fiber optic cable of the FOSS system being coupled in communication with a controller for monitoring conditions associated with the pan line, according to an exemplary embodiment of the present disclosure.

Referring to FIGS. 2 and 3, a fiber optic shape sensing (FOSS) system 116 is depicted. The FOSS system 116 includes a fiber optic cable 118 that would be disposed along the pan segments 104 of the pan line 102 and located within the opening 114 of each pan segment 104. As best shown in FIG. 2, the fiber optic cable 118 would be constrained, at least partially, from moving laterally in relation to the axis of the opening 114 by a tubing system 128 that is disposed within the opening 114 and located around the fiber optic cable 118.

In an embodiment as shown in FIG. 2, the tubing system 128 has a steel tube 130 that is received within the opening 114 and welded to at least one of the first, second, and third walls 126a, 126b, and 126c. Additionally, or optionally, as shown in the embodiment of FIG. 2, the tubing system 128 could also include a thermoplastic tube 132 that could be received within the steel tube 130. Further, the thermoplastic tube 132 could also be configured to extend past an axial length of the associated opening 114 to form a contiguous pathway for the fiber optic cable 118 to be received therein.

It is hereby contemplated that, in embodiments herein, upon arranging adjacently located pan segments 104 in a successive manner, welding the steel tube 130 to at least one of the first, second, and third walls 126a, 126b, and 126c on the underside 112 of respective ones of the pan segments 104 and forming the contiguous pathway by inserting the thermoplastic tube 132 within the welded steel tube 130, one end of the fiber optic cable 118 would be received within an end of the formed contiguous pathway with the help of a cable blowing machine (not shown) and received at another end of the formed contiguous pathway.

As best shown in FIG. 3, the FOSS system 116 would also include a controller 120 that would be communicably coupled to the fiber optic cable 118. For purposes of the present disclosure, it may be noted that the controller 120 disclosed herein could include a controller that may be associated with the pan line 102, another controller that may be associated with the longwall shearer, or yet another controller that may be associated with controlling an overall functioning of the longwall mining system 100.

It may also be noted that the controller 120 disclosed herein could include various software and/or hardware components that are configured to perform functions consistent with the present disclosure. As such, the controller 120 of the present disclosure may be a stand-alone controller or may be configured to co-operate with an existing electronic control module (ECU) (not shown) of the longwall shearer. Furthermore, it may be noted that the controller 120 may embody a single microprocessor or multiple microprocessors that include components for selectively and independently actuating specific system hardware, for example, an engine, brakes, a transmission system and other components that are associated with the longwall shearer.

In operation, the controller 120 disclosed herein would be configured to detect a shape of the fiber optic cable 118 and identify a position of each pan segment 104 based on the detected shape of the fiber optic cable 118. In embodiments herein, the controller 120 may identify the position of each pan segment 104 by deducing the position of corresponding pan segments from at least one of a pitch of the pan line 102 from a start to an end of the pan line 102, a yaw angle of the pan line 102 from the start to the end of the pan line, and a roll angle of each pan segment 104 owing to a pushing or pulling force applied to a relay bar 402 (as shown by bi-directional arrow $D_4$ in FIG. 4) associated with the corresponding pan segment 104. Additionally, the step of identifying the position of each pan segment 104 could also include identifying, by the controller 120, an axial displacement of each pan segment 104 relative to an adjacent pan segment 104.

The controller 120 is further configured to determine if a fault exists in the interconnecting joint 106 between the adjacently located pan segments 104 based on the identified positions of respective ones of the adjacently located pan segments 104. In an embodiment, the controller 120 is also configured to diagnose that the determined fault existing in the interconnecting joint 106 between the adjacently located pan segments 104 is a failure of the interconnecting joint 106 itself. In a further embodiment, based on this diagnosis, the controller 120 is also configured to terminate an operation of a longwall shearer, for instance, by rendering the longwall shearer stationary relative to the pan line 102.

Figure 4:
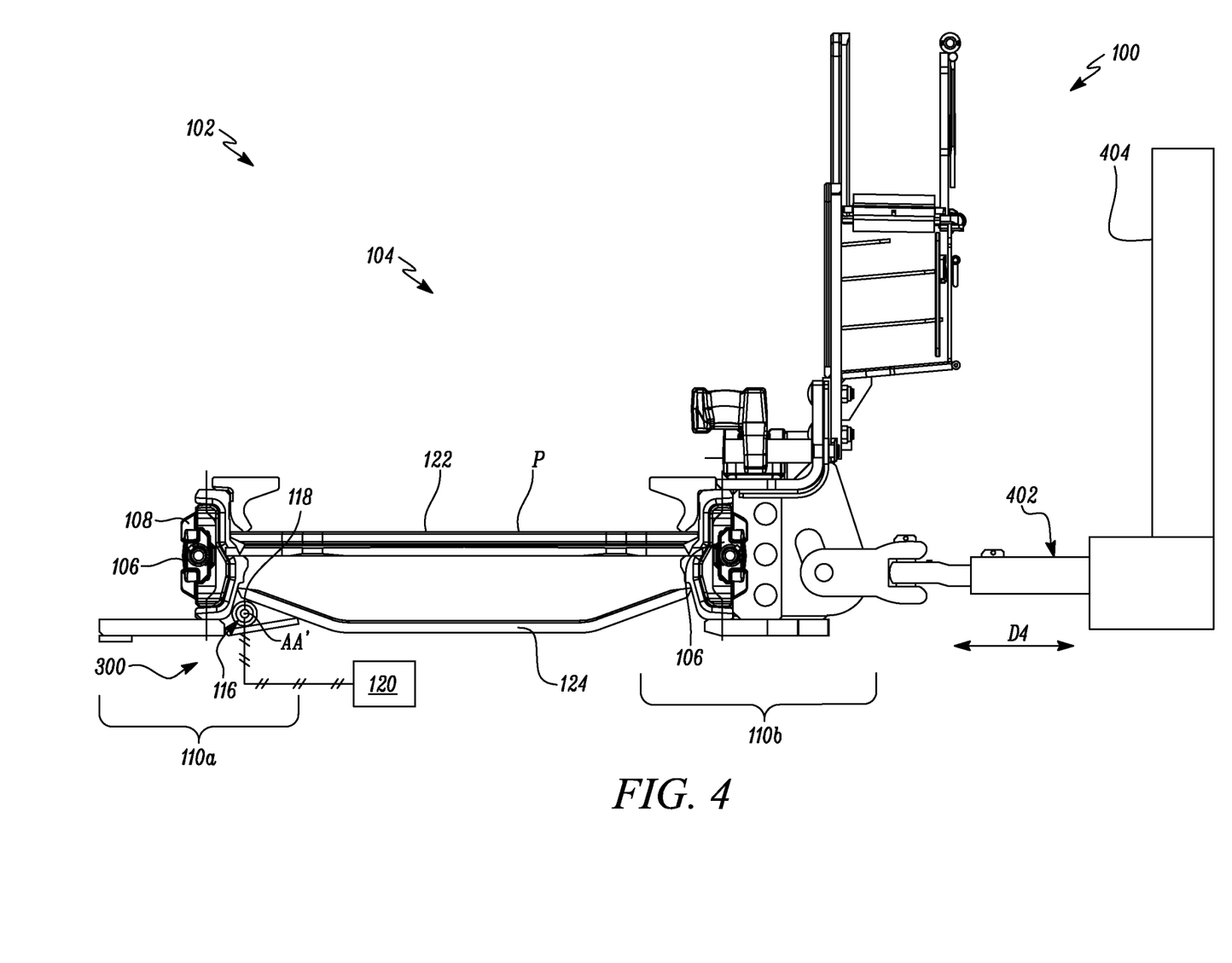
FIG. 4 is a side view of the pan segment together with a relay bar and a roof support system of the longwall mining system, according to an embodiment of the present disclosure.

Also, referring to FIG. 1 and as best shown in FIG. 4, the relay bar 402 is located between a roof support system 404 of the longwall mining system 100 and a corresponding pan segment 104 of the pan line 102. This relay bar 402 is configured to operatively push or pull, and hence, axially displace the pan segment 104, along bi-directional arrow $D_4$, relative to the roof support system 404. Further, it is hereby envisioned that the FOSS system 116 could be associated with the rear portion 110b of the pan line 102, in addition to, or in lieu of the fore portion 110a of the pan line 102. In such an embodiment, the controller 120, shown in FIG. 3, could also be configured to determine that the relay bar 402 of an associated pan segment 104, shown in FIG. 4, is faulty if the associated pan segment 104 does not move in tandem with adjacently located pan segments 104. Also, based on this determination, the controller 120 would be further configured to terminate an operation of the longwall shearer associated with the longwall mining system 100.

Figure 5:
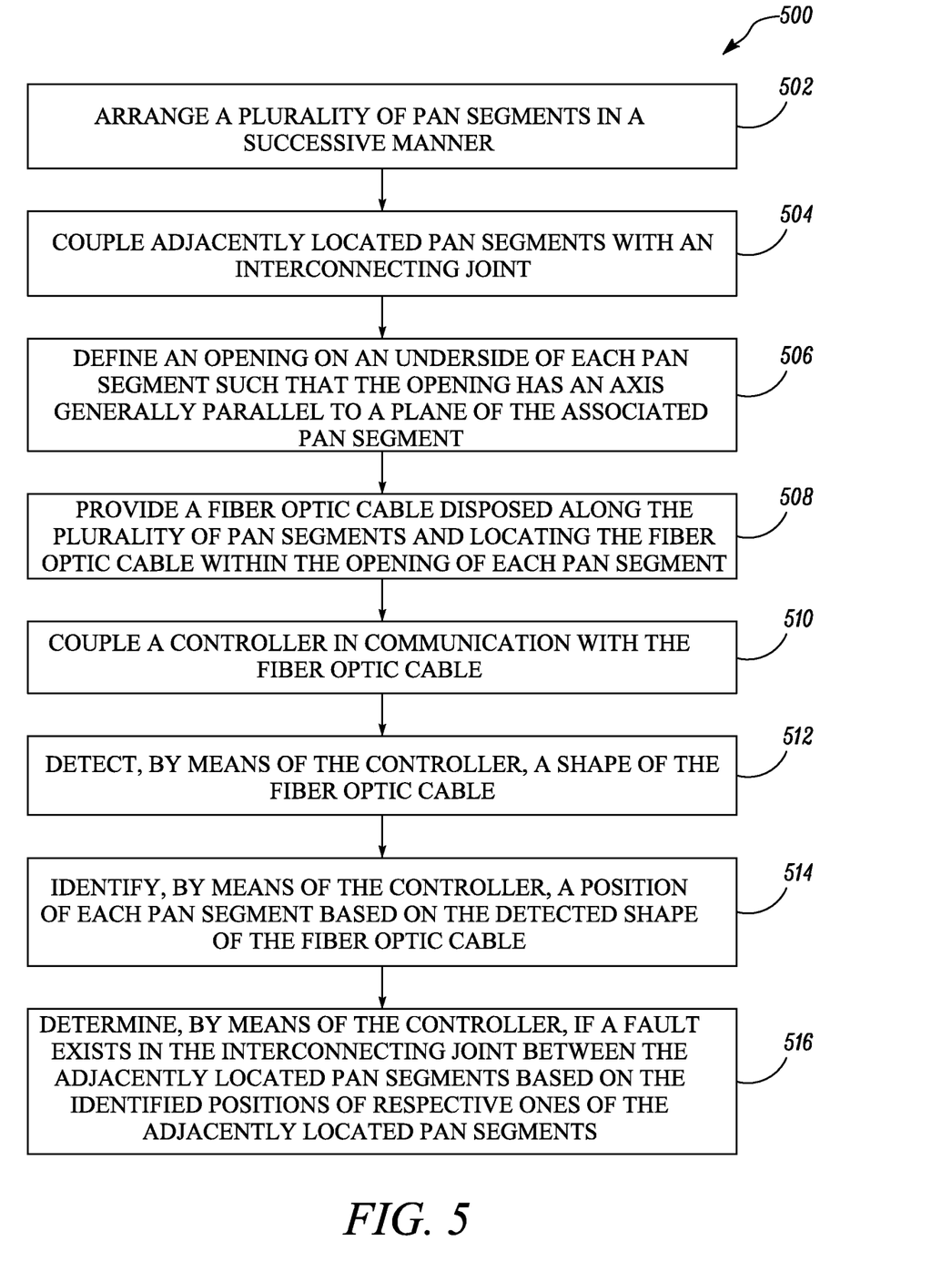
FIG. 5 is a flowchart of a method for monitoring a condition of the pan line that is associated with the longwall mining system of FIG. 1, according to an embodiment of the present disclosure.

FIG. 5 illustrates a flowchart depicting a method 500 for monitoring fault conditions in the pan line 102 of the longwall mining system 100. At step 502, the method 500 includes arranging multiple pan segments 104 in a successive manner. Further, at step 504, the method 500 also includes coupling adjacently located pan segments 104 with the interconnecting joint 106. Further, at step 506, the method 500 also includes defining the opening 114 on the underside 112 of each pan segment 104 such that the axis of the opening 114 is generally parallel to the plane P of the associated pan segment 104. Further, at step 508, the method 500 also includes providing the fiber optic cable 118 along the multiple pan segments 104 such that the fiber optic cable 118 is located within the opening 114 of each pan segment 104. Furthermore, Further, at step 510, the method 500 also includes coupling the controller 120, in communication, to the fiber optic cable 118.

Thereafter, at step 512, the method 500 includes detecting, by means of the controller 120, a shape of the fiber optic cable 118. Further, as shown at step 514, the method 500 includes identifying, by means of the controller 120, a position of each pan segment 104 based on the detected shape of the fiber optic cable 118. Furthermore, as shown at step 516, the method 500 includes determining, by means of the controller 120, if a fault exists in the interconnecting joint 106 between the adjacently located pan segments 104 based on the identified positions of respective ones of the adjacently located pan segments 104.

As disclosed in an embodiment earlier herein, the controller 120 would also be configured to diagnose whether the determined fault existing in the interconnecting joint 106 between the adjacently located pan segments 104 is a failure of the interconnecting joint 106 itself. Based on this diagnosis, the controller 120 could also be configured to terminate an operation of a longwall shearer, for instance, by rendering the longwall shearer stationary relative to the pan line 102.

As disclosed in another embodiment earlier herein, the controller 120 would also be configured to determine that the relay bar 402 of an associated pan segment 104, shown in FIG. 4, is faulty if the associated pan segment 104 does not move in tandem with adjacently located pan segments 104. Also, based on this determination, the controller 120 would be further configured to terminate an operation of the longwall shearer associated with the longwall mining system 100.

INDUSTRIAL APPLICABILITY

Embodiments of the present disclosure have applicability for use in monitoring a condition of a pan line associated with a longwall mining system. In some previously known monitoring techniques, operators were designated with inspection of the pan line. However, with a manual intervention by operators in the inspection of the pan line, a quality of the inspection could not be assumed as being error free. In other previously known monitoring techniques, sensors were being deployed to monitor the condition of the pan line. However, installation and operation of such sensors was tedious, cumbersome, and expensive in many cases.

With use of embodiments disclosed herein, the FOSS system 116 disclosed herein overcomes the aforementioned drawbacks of previously known monitoring techniques. The FOSS system 116 of the present disclosure is easy to install and operate as compared to an implementation i.e., an installation and operation of previously known inspection techniques. Besides, the FOSS system 116 of the present disclosure obviates the need for manual intervention thereby facilitating reduced fatigue by operators. Also, by obviating the need for manual intervention with the implementation of the FOSS system 116, monitoring the condition of the pan line 102 can be automated in a way that is pursuant to achieving a complete autonomous functioning of the pan line 102.

Moreover, with the implementation of the FOSS system 116 on the pan line 102, the controller 120 of the FOSS system 116 can terminate the operation of the longwall shearer if, based on the detected shape of the fiber optic cable 118, the identified positions of the adjacent pan segments 104 are indicative of a failure of the interconnecting joint 106. This way, consequential negative impacts, owing to failure of the interconnecting joint 106, to the overall operation of the longwall mining system 100 can be mitigated. Moreover, implementation of the FOSS system 116 could also be used to improve operator safety in an underground mining environment where the longwall mining system 100 is being used.

While aspects of the present disclosure have been particularly shown and described with reference to the embodiments above, it will be understood by those skilled in the art that various additional embodiments may be contemplated by the modification of the disclosed vehicles, systems and methods without departing from the spirit and scope of what is disclosed. Such embodiments should be understood to fall within the scope of the present disclosure as determined based upon the claims and any equivalents thereof.

What is claimed is:

1. A system for monitoring a condition of a pan line associated with a longwall mining system, the system comprising:
   a plurality of pan segments arranged in a successive manner such that adjacently located pan segments are moveably coupled by an interconnecting joint;
   an underside of each pan segment configured to define an opening therein, the opening having an axis generally parallel to a plane of the associated pan segment;
   a fiber optic shape sensing system having:
      a fiber optic cable disposed along the plurality of pan segments and located within the opening of each pan segment; and
      a controller communicably coupled to the fiber optic cable, the controller configured to:
         detect a shape of the fiber optic cable;
         identify a position of each pan segment based on the detected shape of the fiber optic cable; and
         determine if a fault exists in the interconnecting joint between the adjacently located pan segments based on the identified positions of respective ones of the adjacently located pan segments.

2. The system according to claim 1, wherein the opening of each pan segment is bound by at least three sides by a first wall, a second wall, and a third wall located on the underside of the associated pan segment.

3. The system according to claim 2, wherein the fiber optic cable is constrained, at least partially, from moving laterally in relation to the axis of the opening by a tubing system that is disposed within the opening and located around the fiber optic cable.

4. The system according to claim 3, wherein the tubing system associated with each pan segment has:

a steel tube received within the opening and welded to at least one of the first, second, and third walls; and a thermoplastic tube received within the steel tube, the thermoplastic tube configured to extend past an axial length of the associated opening to form a contiguous pathway for the fiber optic cable to be received therein.

5. The system according to claim 4, wherein, upon arranging adjacently located pan segments in a successive manner, welding the steel tube to at least one of the first, second, and third walls on the underside of respective ones of the pan segments and forming the contiguous pathway by inserting the thermoplastic tube within the welded steel tube, an end of the fiber optic cable is received within an end of the formed contiguous pathway with the help of a cable blowing machine and received at another end of the formed contiguous pathway.

6. The system according to claim 1, wherein the controller is configured to diagnose that the determined fault existing in the interconnecting joint between the adjacently located pan segments is a failure of the interconnecting joint.

7. The system according to claim 6, wherein the controller is configured to terminate, based on the diagnosis, an operation of a longwall shearer associated with the longwall mining system.

8. The system according to claim 1, wherein identifying the position of each pan segment includes identifying an axial displacement of each pan segment relative to an adjacent pan segment.

9. The system according to claim 1, wherein identifying the position of each pan segment includes deducing, by the controller, the position of each pan segment from at least one of: a pitch of the pan line from a start to an end of the pan line, a yaw angle of the pan line from the start to the end of the pan line, and a roll angle of each pan segment owing to a pushing or pulling force applied to a relay bar of a corresponding pan segment.

10. The system according to claim 9, wherein the controller is configured to:
determine that the relay bar of an associated pan segment is faulty if the associated pan segment does not move in tandem with adjacently located pan segments; and
terminate, based on the determination, an operation of a longwall shearer associated with the longwall mining system.

11. A method for monitoring a condition of a pan line associated with a longwall mining system, the method comprising:
arranging a plurality of pan segments in a successive manner,
coupling adjacently located pan segments with an interconnecting joint,
defining an opening on an underside of each pan segment such that the opening has an axis generally parallel to a plane of the associated pan segment;
providing a fiber optic cable disposed along the plurality of pan segments and locating the fiber optic cable within the opening of each pan segment,
coupling a controller, in communication, to the fiber optic cable,
detecting, by means of the controller, a shape of the fiber optic cable;
identifying, by means of the controller, a position of each pan segment based on the detected shape of the fiber optic cable; and
determining, by means of the controller, if a fault exists in the interconnecting joint between the adjacently located pan segments based on the identified positions of respective ones of the adjacently located pan segments.

12. The method according to claim 11, wherein the opening of each pan segment is defined such that the opening is bound by at least three sides by a first wall, a second wall, and a third wall located on the underside of the associated pan segment.

13. The method according to claim 12 further comprising providing a tubing system within the opening and around the fiber optic cable such that the fiber optic cable is constrained, at least partially, from moving laterally in relation to the axis of the opening.

14. The method according to claim 13, wherein providing the tubing system includes:
receiving a steel tube within the opening, and welding the received steel tube to at least one of the first, second, and third walls; and
receiving a thermoplastic tube within the steel tube such that the thermoplastic tube extends past an axial length of the associated opening for forming a contiguous pathway; and
receiving the fiber optic cable within the contiguous pathway.

15. The method according to claim 14, wherein, upon arranging adjacently located pan segments in a successive manner, welding the steel tube to at least one of the first, second, and third walls on the underside of respective ones of the pan segments and forming the contiguous pathway by inserting the thermoplastic tube within the welded steel tube, an end of the fiber optic cable is received within an end of the formed contiguous pathway with the help a cable blowing machine and received at another end of the formed contiguous pathway.

16. The method according to claim 11 further comprising diagnosing, by means of the controller, that the determined fault existing in the interconnecting joint between the adjacently located pan segments is a failure of the interconnecting joint.

17. The method according to claim 16 further comprising terminating, by the controller based on the diagnosis, an operation of a longwall shearer associated with the longwall mining system.

18. The method according to claim 11, wherein identifying the position of each pan segment includes identifying an axial displacement of each pan segment relative to an adjacent pan segment.

19. The method according to claim 11, wherein identifying the position of each pan segment includes deducing, by the controller, the position of each pan segment from at least one of: a pitch of the pan line from a start to an end of the pan line, a yaw angle of the pan line from the start to the end of the pan line, and a roll angle of each pan segment owing to a pushing or pulling force applied to a relay bar of a corresponding pan segment.

20. The method according to claim 19 further comprising:
determining, by the controller, that the relay bar of an associated pan segment is faulty if the associated pan segment does not move in tandem with adjacently located pan segments; and
terminating, by means of the controller based on the determination, an operation of a longwall shearer associated with the longwall mining system.

* * * * *